(No Model.) 3 Sheets—Sheet 1.

H. F. BELCHER.
MOSAIC OF GLASS AND LEAD GLAZING.

No. 303,359. Patented Aug. 12, 1884.

Witnesses:
John C. Tunbridge
F. T. Campbell

Inventor:
Henry F. Belcher,
by Drake & Co., Att'ys.

N. PETERS, Photo-Lithographer, Washington, D. C.

(No Model.) 3 Sheets—Sheet 2.
H. F. BELCHER.
MOSAIC OF GLASS AND LEAD GLAZING.
No. 303,359. Patented Aug. 12, 1884.
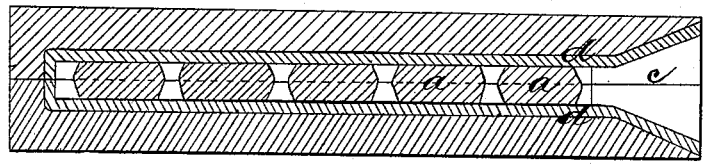
Fig. 8.
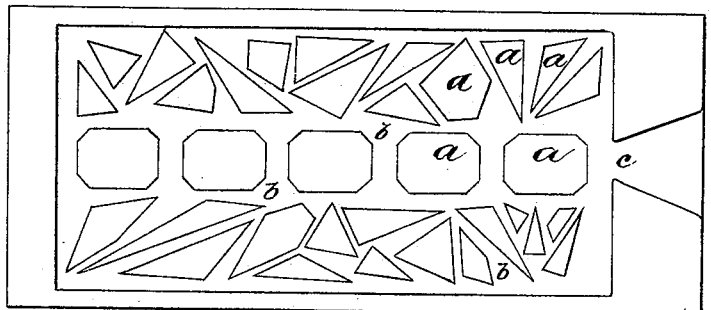
Fig. 9.
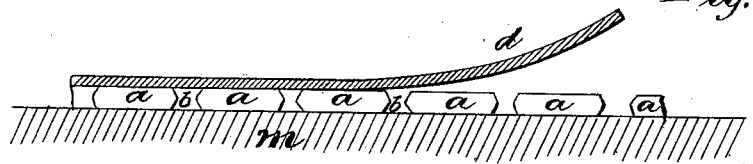
Fig. 10.
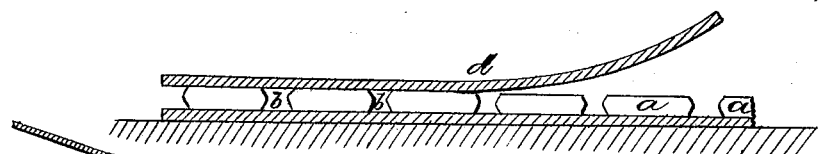
Fig. 11.
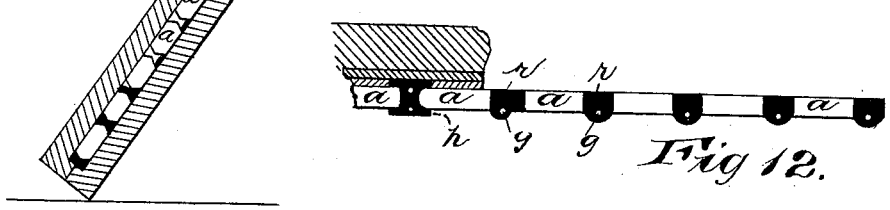
Fig. 12.
Fig. 13.
Witnesses:
T. F. Campbell.
Chas. F. Herr.
Inventor:
Henry F. Belcher,
by Drake & Co. Att'ys.
N. PETERS. Photo-Lithographer, Washington, D. C.

(No Model.) 3 Sheets—Sheet 3.
H. F. BELCHER.
MOSAIC OF GLASS AND LEAD GLAZING.
No. 303,359. Patented Aug. 12, 1884.
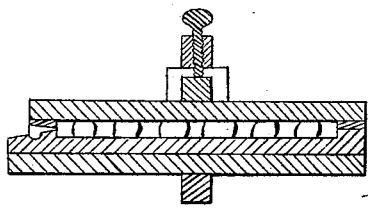
Fig. 14.
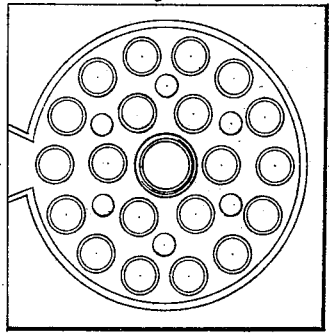
Fig. 15.
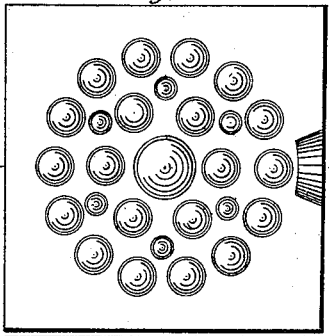
Fig. 16.
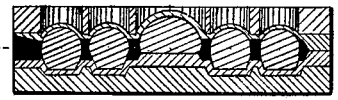
Fig. 17.
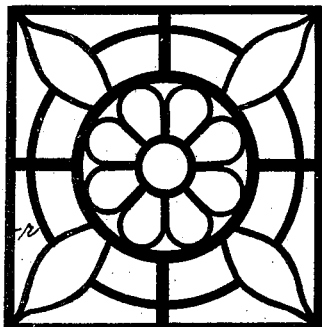
Fig. 18.
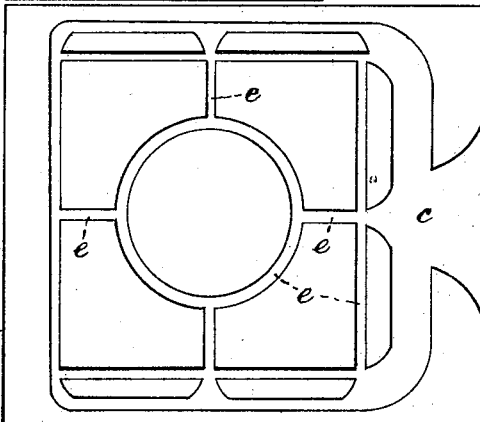
Fig. 19.
Fig. 20.
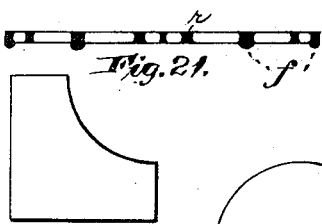
Fig. 23.
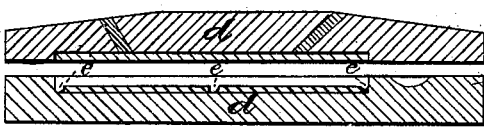
Fig. 21. Fig. 22.
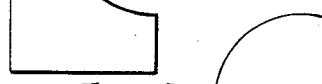
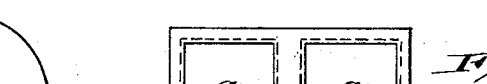
Fig. 25.
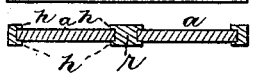
Fig. 24. Fig. 26.
Witnesses:
T. H. Campbell.
Chas. F. Heu.
Inventor:
Henry F. Belcher,
by Draker & Co., Att'ys.

UNITED STATES PATENT OFFICE.

HENRY F. BELCHER, OF IRVINGTON, NEW JERSEY.

MOSAIC OF GLASS AND LEAD GLAZING.

SPECIFICATION forming part of Letters Patent No. 303,359, dated August 12, 1884.

Application filed October 27, 1883. (No model.)

*To all whom it may concern:*

Be it known that I, HENRY F. BELCHER, a citizen of the United States, residing at Irvington, in the county of Essex and State of New Jersey, have invented certain new and useful Improvements in Mosaics of Glass, &c., and Lead Glazing; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of mosaics formed by casting a metallic frame-work around mineral pieces previously prepared and arranged in position to produce the required design.

The object of the invention is to reduce the cost of producing such mosaics, to secure a more perfect finish, to gain greater firmness or rigidity in the finished product, and to facilitate the manufacture thereof.

The invention consists in the improved mosaic and in the process of producing the same, all substantially as will be hereinafter set forth, and finally embodied in the several clauses of the claim.

Figure 1:
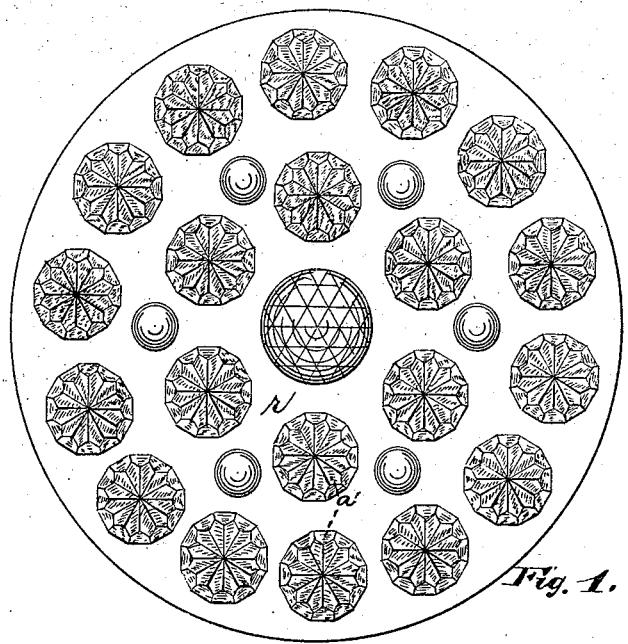
Figure 2:
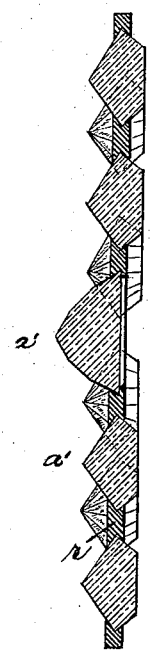
Figure 3:
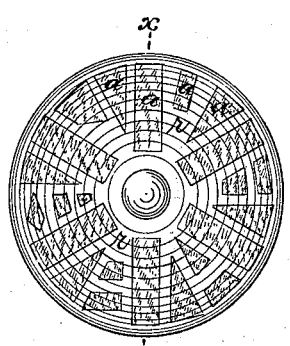
Figure 4:
Figure 6:
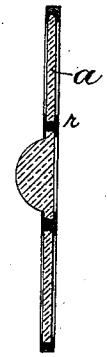
Figure 5:
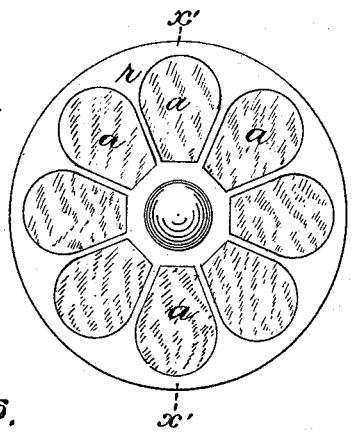
Figure 7:
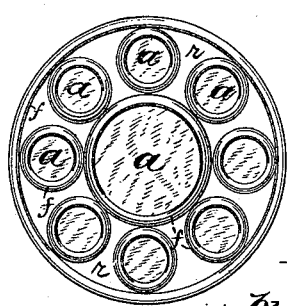

Referring to the accompanying drawings, comprised in three sheets, in which like letters of reference indicate corresponding parts in each of the several figures, Figure 1, Sheet 1, is a plan of a mosaic having projecting jewels, with a cast frame-work therearound, adapted to hold and holding the several parts securely together. Fig. 2 is a sectional view of the same. Figs. 3 and 4 are respectively a plan and section of a hollow or concaved mosaic, showing a projecting jewel which may be secured therein. Figs. 5 and 6 are respectively a plan and section of a flat roundel with a projecting jewel arranged in connection with pieces placed flush with the frame, and Fig. 7 illustrates a mosaic provided with strengthening-ribs formed on the frame-work. Figs. 8 and 9, Sheet 2, illustrate the arrangement of mineral pieces in molds, and Figs. 10, 11, and 13 illustrate certain processes in the manufacture of the mosaic. Fig. 12 shows a section of a mosaic with strengthening-ribs, with the addition of wires cast therein. Fig. 14, Sheet 3, shows sections of a mold clamped together in a press. Figs. 15 and 16 are plans of mold or matrix sections adapted to cast a frame around projecting jewels, and Fig. 17 is a sectional view of said sections, showing said jewels therein. Figs. 18, 19, 21, 22, 23, and 24 illustrate a certain form of mosaic and a particular mold therefor. Fig. 20 is a section of a jewel in detail, and Figs. 25 and 26 illustrate certain strengthening-ribs overlapping the glass or mineral parts.

In carrying out the invention, I arrange the several or many pieces or portions, $a$, of glass or other mineral plates, which go to make up the desired design, and which may be of any size or shape, between sheets, plates, or molds $d$, Figs. 8, 13, 14, 17, 22, of suitable material and construction, in such a manner as that each individual piece or portion shall be detached from those laterally adjacent, a passage or passages, $b$, being formed around said pieces or portions communicating with a supply-opening, $c$, lying between said plates close to the edges thereof. Through said supply-opening is poured the liquid metal, which, passing through the passages $b$ and finally filling the same, hardens and forms a metallic frame-work, $r$, the parts of which are integral with one another. The sheets or plates $d$, pressing against the opposite faces of the glass or mineral parts, prevent the metal from covering the same, so that when the sheets or plates are removed the colors of the glass or mineral parts are exposed to view.

The preferred methods of casting the frame-work around the portions of glass and the peculiar description of mosaics resulting from such methods I shall now more definitely describe.

I arrange the glass or mineral portions or fragmentary plates $a$, glass being used when the mosaics are employed in windows or in other situations where it is desirable that light shall be allowed transmission, upon a table or surface, $m$, Fig. 10, Sheet 2, upon which table may be marked or laid out the pattern of the desired design, to facilitate the adjustment of the plates. Said pieces are set at distances apart equal to the desired width of frame. Upon said pieces, and over the passages or interstices between the same, is pressed a sheet of asbestus or other flexible material, which, having been gummed or covered with an adhesive substance, adheres to said pieces, so that when said sheet is raised, as it subsequently is, and turned over, the glass portions are brought to the top of the sheet without being changed in their relations to one another. A second sheet similarly gummed is then caused to adhere to the other sides of the glass portions and the parts laid aside to dry, a warm drying-chamber being employed. After this the sheets with the mineral parts between are placed in suitable frames or molds, and tilted up, as shown in Fig. 13, so that the metal can be poured between the edges of the sheets and into the passages between the sheets. Such being done and the passages filled, the metal hardens and forms a frame-work around the glass or mineral parts which holds said parts in fixed relation to one another. I prefer to heat the glass and asbestus sheets to quite a high degree of temperature, so that the metal will not harden or solidify before it has completely filled the passages. I prefer to use as a binding metal one—such as an alloy of lead, antimony, and bismuth—that will expand in cooling, and one having a low point of fusion. A preferred composition for this purpose will probably form the subject-matter of a subsequent application. The expansibility of the metal in cooling causes the same to hold the glass portions with great firmness and prevents the looseness and consequent rattle resulting from the use of contractile metal, such as pure lead.

I do not wish to limit myself to the use of flexible sheets of material or to gummed sheets in the process of casting a frame-work around mineral pieces, as any device adapted to hold the said pieces in fixed position between two surfaces, so that they may be subsequently cast to form a mosaic, embodies the spirit of my invention and may be employed. But I prefer the employment of asbestus in the process, as it cannot be destroyed by contact with molten metal, is porous, and thus allows the exit of air to a certain extent as the passages fill with metal, is pliable and plastic when damp, and thus is easily made to conform to uneven surfaces, and is otherwise peculiarly adapted for the purpose.

In preparing the sheets having the mineral parts therebetween to receive the metal, I prefer to employ a suitable press—such, for example, as is illustrated in Fig. 14, Sheet 3. By means of this device the side plates or sheets are brought into perfect contact with the sides of the portions of glass, so that the metal will be more effectually prevented from covering the side surfaces of said glass portions.

Under certain circumstances it is found desirable that a heavier frame than that lying flush with the side faces of the glass is desirable, and to produce such a frame I form in the side plates or sheets a groove or grooves, $e$, Figs. 19, 22, Sheet 3, corresponding with the passages between the glass portions $a$ or some of said passages. By thus doing, a transverse rib or ribs, $f$, Figs. 7, 12, 21, integral with the cast frame-work is formed, which adds greatly to the stiffness of the mosaic, as will be evident. The grooves may be formed in the sheet material before it is applied to the surface of mineral portions by making corresponding grooves in an appropriate bed, then laying the damp sheet thereover and pressing said sheet into said grooves, after which the damp material is allowed to dry. After this the said material is gummed and placed in position on the surface of the mineral portions.

Should I wish to give greater strength to the mosaic than the ribs $f$ afford, I may enlarge the grooves $e$ and arrange therein suitable bars or wires. Around these are cast the binding metal, the wires being inclosed with the softer metal forming cores $g$, Fig. 13, which add greatly to the tenacity of the frame-work. Under other circumstances it is desirable not only to give firmness or rigidity to the mosaic as a whole by forming the transverse strengthening-ribs, but it is also desirable to give greater security to the individual pieces of glass. To this end I may form the cast frame-work as illustrated by Figs. 25, 26, Sheet 3, in which case the cast frame-work has projecting and overlapping flanges, which overlie the edges of the mineral pieces, holding the same with such firmness as to prevent the same from being easily detached by the force of impact. This result I gain by first securing upon the surface or surfaces of the glass portions sheets of material of a size smaller than the glass or mineral portions, so that when the glass and sheet secured thereon are in position the former will project from the latter, as shown in Fig. 12, the passages thus formed being T or I shaped, and thus adapted to cause the metal to form the overlying flanges.

It will thus be observed that the strengthening-ribs, broadly considered, may be formed either by grooving the plate $d$ or by building the same up by applying sheets of material, said grooves lying therebetween. This building process may be also applied in forming simple strengthening-ribs. For example, the sheets of material illustrated in Figs. 23, 24 may be arranged in the molds, as shown in Figs. 19, 22, to produce the ribs shown in Fig. 21.

When the asbestus or flexible sheets or plates of material provided with adhesive substance are applied to the portions of glass and the casting process is completed, said sheets may be removed by simply wetting them and dissolving the adhesive substance, after which said sheets may be removed for subsequent use.

I have found it desirable under some circumstances to form the mosaic hollow or concaved, as exemplified in Figs. 3 and 4, Sheet 1.

By this construction certain peculiar effects of illumination are produced when employed in windows, or as roundels for windows, or when employed in a larger and varied form, as in lamp shades or globes, the integrality of the frame-work allowing of adequate strength to such frame-work without requiring such a large proportion of opaque surface as has been heretofore necessary when the frames of said shades or globes were of metallic portions soldered together to form the frame-work, as will be understood.

The hollow or concaved form of mosaic with integral frame-work may be provided with strengthening-ribs and with projecting jewels, as in the case of the flat mosaics before described.

As an article adapted to be inserted in windows, the roundel displayed in Figs. 1 and 2 possesses properties which make it peculiarly effective for purposes of illumination. The projecting jewels $a'$ concentrate the light and throw it into the room with peculiar brilliancy, while the cast frame-work being opaque, and allowing of a much wider surface than can be obtained by the ordinary processes of lead-glazing, brings the colors of the projecting jewels into strong prominence and produces effects which are new in window-ornamentation.

I do not wish to be understood as donating or abandoning to the public anything patentable that has been herein for the first time disclosed to the public, and such devices that are employed in the operations of manufacture and are patentably new, will probably form the subject-matter of subsequent applications, and are hereby disclaimed.

Having thus described my invention, what I claim as new is—

1. The process of forming mosaics—to wit, of arranging mineral portions in separated relation to one another between clamping-surfaces and filling the interstices or passages between said mineral portions with a solidifiable liquid material, substantially as set forth.

2. The process herein set forth of producing mosaics—to wit, of arranging mineral portions in separated relation to one another between holding-surfaces, of bringing said mineral portions to an abnormally high degree of temperature, and filling the passages between the mineral parts with liquid metal, substantially as set forth and shown.

3. The process of manufacturing mosaics—to wit, of arranging mineral portions on a suitable table or surface, causing said portions to adhere to a gummed sheet or surface, to reversing or turning said sheet and causing a second sheet or surface to adhere to the opposite side of said portions, and combining said portions by casting molten metal around them, substantially as set forth and shown.

4. The process of forming mosaics—to wit, of securing mineral portions between sheets or plates, said portions being arranged at suitable distances apart to form passages, of arranging said sheets with the mineral portions between in suitable presses, and tilting the said parts upon their edges, to allow the metal to be poured between the sheets or plates, all substantially as herein set forth.

5. The process of forming mosaics—to wit, of securing mineral portions between dampened and gummed sheets of asbestus, and subsequently casting molten metal around said portions to form an integral frame-work, as set forth.

6. As an improved article of manufacture, a mosaic formed of mineral parts having a metallic frame-work cast thereround, and provided with strengthening-ribs cast integral with said frame-work, substantially as set forth and shown.

7. A mosaic having the portions $a$ secured together with a cast frame-work, said frame-work having the projecting ribs and overlapping flanges $h$, substantially as set forth and shown.

8. A concaved or hollow mosaic, the portions $a$ of which are secured together by a cast-metal frame-work, substantially as set forth and shown.

9. A cast metallic frame-work provided with projecting jewels, said jewels being secured therein in the casting process, the whole forming a mosaic, as set forth and shown.

10. The process of forming glass or mineral mosaics—to wit, of casting around the mineral portions a frame-work of expansible metal, or one that will expand in cooling, substantially as set forth.

11. A mosaic having strengthening-ribs, provided with a core wire or rod, substantially as set forth.

12. The process of forming mosaics—to wit, of arranging the mineral parts in a separated relation to one another upon a table, surfaces, or groundwork, of transferring said parts without changing or disturbing their relative positions to one another to a press or mold, and casting a frame-work around said mineral parts, substantially as set forth.

In testimony that I claim the foregoing I have hereunto set my hand this 11th day of August, 1883.

HENRY F. BELCHER.

Witnesses:
CHARLES H. PELL,
F. F. CAMPBELL.